Aug. 7, 1934.   L. F. STEVENSON   1,969,163
CONTROL MEANS FOR GAS BURNERS
Filed June 17, 1932   2 Sheets-Sheet 1
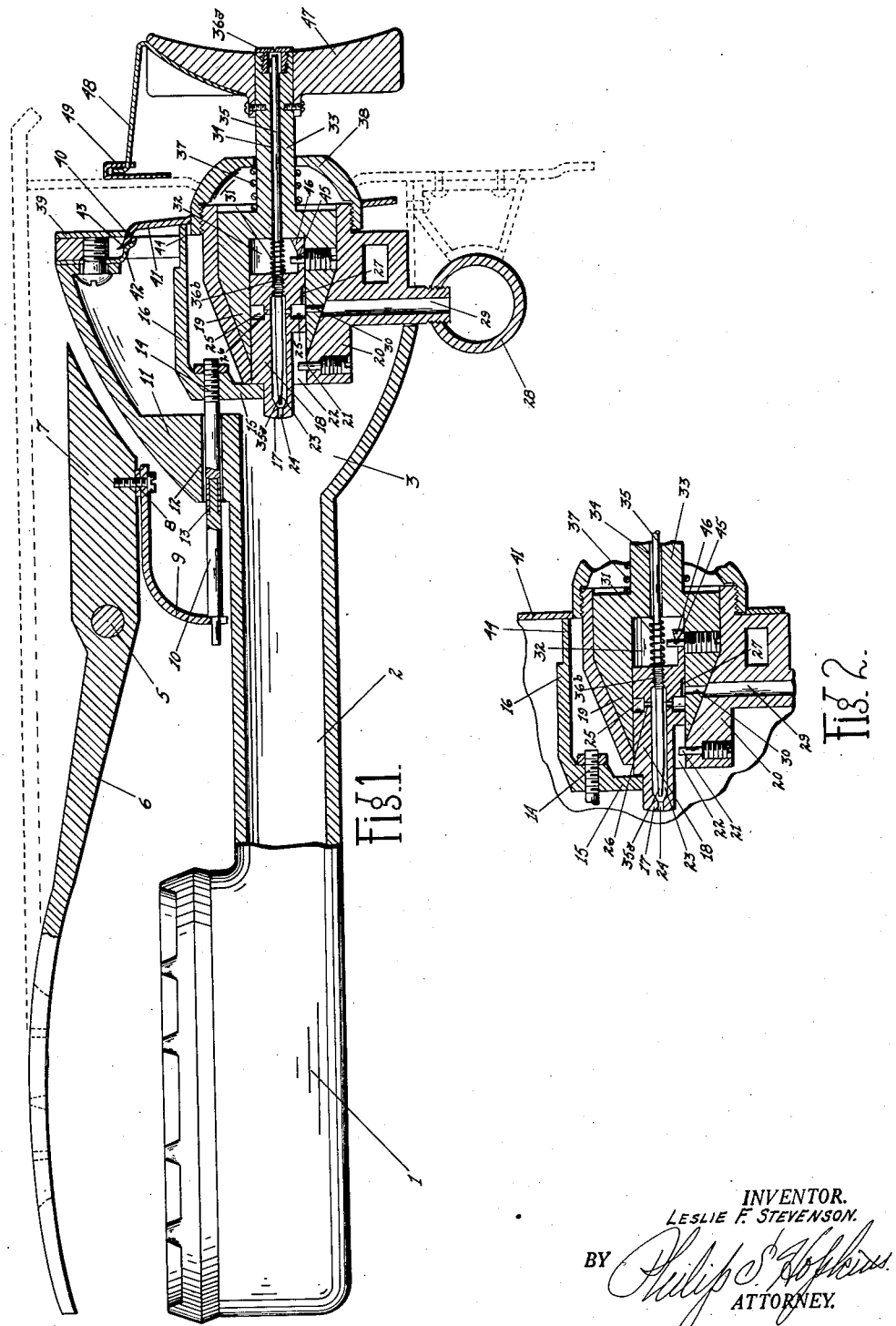
INVENTOR.
LESLIE F. STEVENSON.
BY
ATTORNEY.

Aug. 7, 1934.  L. F. STEVENSON  1,969,163
CONTROL MEANS FOR GAS BURNERS
Filed June 17, 1932  2 Sheets-Sheet 2

INVENTOR.
LESLIE F. STEVENSON.
BY
ATTORNEY.

Patented Aug. 7, 1934

1,969,163

UNITED STATES PATENT OFFICE 1,969,163

CONTROL MEANS FOR GAS BURNERS

Leslie F. Stevenson, Geneva, N. Y.

Application June 17, 1932, Serial No. 617,829

5 Claims. (Cl. 158—120)

My invention relates to a control means for gas burners, and has for its primary object the provision of a combined automatic and manual control for the fuel feed for gas burners such as are commonly used on gas stoves.

An important object of my invention lies in the provision of an automatic air controlling means associated with the fuel control.

Another object of my invention lies in the provision of an improved valve arrangement for controlling the fuel supply to the gas burner.

Still another object of my invention lies in the provision of a novel manual control cooperating with the automatic control and which renders the device practically universal in its application.

Other objects and advantages in details of construction will be apparent as the description proceeds, reference now being had to the figures of the accompanying drawings forming a part of this application, and wherein like reference numerals indicate like parts.

In the drawings:

Figure 1 is a side view largely in section illustrating my invention.

Figure 2 is a detail view of the valve device thereof in closed position.

Figure 3:
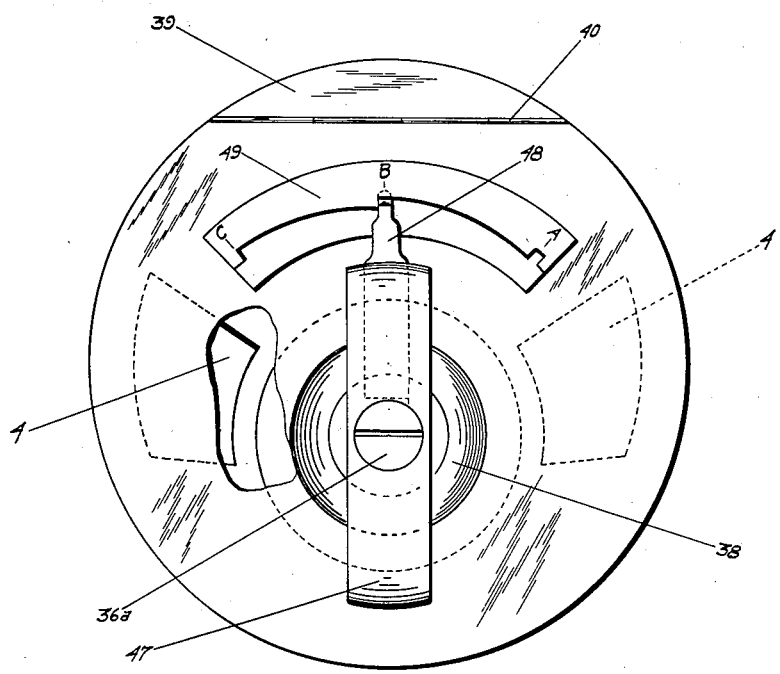
Figure 3 is a front plan view of the controlling means.
Figure 4:
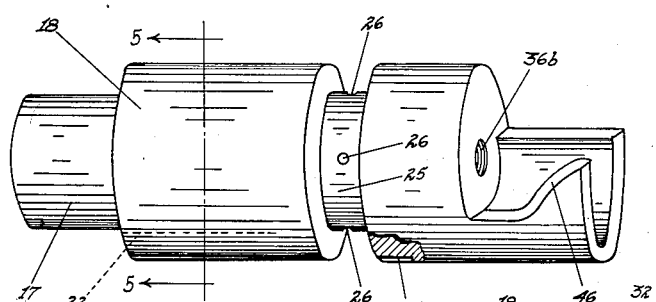
Figure 4 is an enlarged detail perspective view illustrating a portion of the valve structure.
Figure 5:
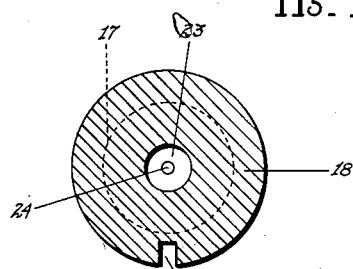
Figure 5 is a cross sectional view taken on the line 5—5 of Figure 4.
Figure 6:
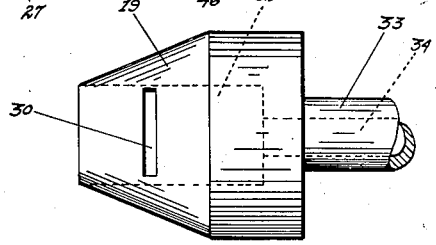
Figure 6 is a detail view of another portion of the valve structure.

While I have illustrated my invention in connection with only one burner such as is commonly used on gas stoves, it will be clear that each burner of a stove is equipped with a similar device.

The reference character 1 refers generally to a gas burner communicating through a suitable pipe 2 with a mixing chamber 3. These elements are usually and preferably cast or formed as a single unit.

The mixing chamber 3 is provided at one end with suitable openings 4 (see Figure 3) for the admission of air to the mixing chamber in order to provide the proper air and gas mixture for combustion at the burner 1.

Pivoted in any suitable manner as at 5 is a spider arm 6, one end of which overlies the burner 1 in position to receive a vessel which it is desired to heat by means of the burner. The opposite end of the spider 6 is preferably heavier than the burner end, as indicated at 7, and is provided on its underside as by the screw 8 with a leaf spring member 9, the free end of which engages with one end of a slidable rod 10 journaled in the thickened portion 11 of the wall of the mixing chamber 3. The rod 10 is freely slidable through and guided by a recess 12 in such thickened portion 11. This rod 10 is preferably in two sections telescoped together as at 13 to permit free sliding thereof and to prevent binding during movement by the arcuately movable spring 9. The opposite end of the rod 10 is preferably threaded as at 14 for adjustable rigid engagement with a downwardly extending portion 15 of an actuating bracket 16.

This downwardly extending end 15 of the actuating bracket 16 is adapted to engage a shoulder provided adjacent the end 17 of a slidable valve member 18 adapted for longitudinal slidable movement within a centrally recessed outer valve portion 19 which is rotatable within a casing 20 suitably supported within the mixing chamber 3. A pin 21 fixed in one wall of the casing 20 extends into a key slot 22 in the inner valve member 18 to prevent rotation of such inner valve member but permitting free longitudinal sliding thereof.

The slidable inner valve member 18 is cored out for its entire length as at 23, communicating by means of the reduced opening 24 with the mixing chamber 3 and the connecting pipe 2 to the burner 1.

Intermediate the ends of the slidable inner valve member 18 there is provided a peripheral groove or recess 25 communicating at a plurality of points, as by means of the passages 26 with the passage 23 extending longitudinally through the valve. On one side of the slidable valve member 18 and communicating with the recesses 25 is a slightly elongated groove or recess 27 for a purpose to be described.

The reference character 28 indicates the main gas supply line, communicating through the passage 29 in an extension of the casing 20, with the rotatable valve member 19. This rotatable valve member is provided at one point with an elongated slot or opening 30 adapted to communicate through the passage 29 to the gas supply pipe 28 and with the recess 25 in the slidable valve member 18 and in certain positions of such slidable valve member, with the elongated slot or recess 27 therein.

The slidable valve member 18 is normally urged to the left in Figure 1 by means of a coil spring 31 positioned within the recess 32 of the rotary valve member 19 and bearing at one end against the valve casing 19 and at the other end against the sliding valve 18. The stem 33 of the rotary valve 19 extends outwardly and is cored out as at 34 in alignment with the core 23 of the slidable valve 18. Positioned within the openings or cores 23 and 34 is an elongated needle valve 35, the pointed end 35a of which cooperates with the reduced opening 24 in the end of the sliding valve 18 and the opposite end of which extends to a point adjacent the end of the stem 33 where it may be engaged by a suitable tool for adjustment. A cover member 36a is removably positioned over the end of the stem 33 to protect the needle valve against inadvertent adjustment. The needle valve 35 has threaded engagement with the sliding valve at 36b, for adjustment. The rotary valve member 19 is normally urged to the left into close engagement with the inner wall of the casing 20, by means of the coil spring 37 positioned between the end of the valve member 19 and a housing 38 suitably secured as by screw threads, to the casing 20.

Hinged to the front 39 of the mixing chamber 3, as at 40, is the air control cover member 41 encircling the housing 38 and normally urged into flat covering engagement with the end of the mixing chamber 3, thus covering the air openings 4. The cover member 41 is normally urged into this covering position by means of a leaf spring 42 carried by the front of the mixing chamber casing and engaging at its lower free end with an extension 43 of the cover plate 41 above the hinge point 40. The normal engagement of these parts 42 and 43 is such as to urge the cover member 41 into flat engagement with the front of the mixing chamber casing.

The actuating bracket 16 is adapted to engage with its end 44 the inside of the cover member 41 when such actuating member is moved to the right as shown in Figure 1, and rock the cover member away from the air openings 4, for a purpose to be described.

The rotatable valve member 19 is provided with a pin 45 extending into the recess 32 in which the valve member 18 slides. The rear end of the slidable valve member 18 is provided with a cut-a-way portion having a beveled or cam surface 46 lying in the path of rotation of the pin 45 when said pin is rotated in one direction.

The outer extending end of the valve stem 33 is provided with a handle 47 to which is attached a resilient pointer member 48 cooperating with a scale segment 49 which scale is provided with three stop positions or notches indicated as A, B, and C, in Figure 3.

The operation of my invention will now be described in view of the foregoing described construction and arrangement of parts.

With no vessel in position over the burner 1 and therefore, not engaging the end of the spider 6, such spider will by virtue of the heavier end 7 be normally rocked on its pivot with the burner end thereof elevated and the heavier end 7 thereof lowered. In this position there is no tendency to move the plunger rod 10 to the right in Figure 1 and consequently the spring 31 causes the slidable valve member 18 to move to the left in Figure 1 which in turn moves the actuating member 16 and rod 10, also to the left. This permits the air control covering 41 to close, and brings the relatively small port or recess 27 in the valve member 18 into registry with the port 30 in the rotary valve member 19 and with the passage 29 to the main gas supply 28. In this position therefore, and with the rotatable valve 19 turned to the position shown in Figure 1, that is, with the point in the center or B position, it will be clear that a very small amount of gas will flow through the passage 29, passage 30, small recess 27, communicating recess 25, passage 26, openings 23 and 24 in the mixing chamber and to the burner. It will be understood, of course, that the needle valve 35 will have first been adjusted to the desired degree for maximum flame when the other valves are open. This provides a very low flame at the burner as long as the parts are in this position and the air port covering 41 is obviously closed as very little air is required for such a low flame.

Assuming now with the parts in the position just described, a vessel is set over the burner 1, it engages the end of the spider 6 thereof and rocks the spider upon its pivot, raising the end 7 which causes the spring 9 carried thereby to move the plunger 10 to the right in Figure 1, carrying with it the slidable actuating bracket 16 which simultaneously slides the valve member 18 to the right and rocks the covering 41 to open position. Movement of the slidable valve 18 to the right brings the large peripheral recess 25 into direct registry with the passage 30 in the valve member 19 and the passage 29 to the main gas line. Obviously therefore, the flow of both air and gas to the mixing chamber is increased simultaneously with the setting of a vessel on the burner, which of course, results in instant full flame at the burner. The amount of movement of the air control member can, of course, be regulated in any suitable manner to provide the proper mixture under these circumstances. Obviously also other types of air controlling means could be substituted for the particular one shown which is illustrative only.

It will be clear, therefore, that the flame at the burner 1 is thus automatically controlled from low flame to full flame by the positioning of a vessel on the burner.

If it is desired to shut off the flow of gas to the burner entirely, the user merely rotates the valve member 19, by means of the handle 47, to the right until the pointer 48 reaches the position A on the scale 49. In this position the valve member 19 will carry its elongated recess 30 out of registry with the gas passage 29 thus shutting off completely the flow of gas to the mixing chamber.

If on the other hand, it is desired to control or regulate the amount of flame during the use of the burner, the valve member 19 can be rotated to the left from the center position towards the position C on the scale 49, which results in the end of the elongated recess 27 covering and uncovering to the desired degree the passage 29 thereby regulating the amount of flame as desired. It will be noted also that upon rotating the valve member 19 to the left in Figure 3, for flame regulating purposes, the pin 45 carried by the valve member 19, engages with the cam surface or edge 46 on the slidable valve member 18, causing such slidable valve member to move to the right in Figure 1, against the tension of the spring 31, whereby to bring the relatively large passage or recess 25 into registry with the port 30 and passage 29. This action insures sufficient fuel for the burner 1 during this operation whether the spider 6 is lowered over the burner or not and permits regulation of the flame regardless of whether a vessel is on or off the burner.

Likewise, if desired, the needle valve 35 may be used in flame regulation.

It will be clear also from the foregoing construction and assembly of parts that for dismantling the device for cleaning and the like, all that is necessary is to unscrew the casing housing 38 whereupon the valves 18 and 19 can be pulled outwardly as a unit, the pointer 48 of course, being first disengaged from the scale 49. This is an added convenience contributing to the usefulness of the invention.

Of course, changes may be made in details of construction and arrangement of parts without departing from the spirit and scope of my invention. I do not limit myself therefore, to the exact form herein shown and described other than by the appended claims.

I claim:

1. In combination, a gas burner, a fuel supply line, and a fuel control assembly therebetween comprising a slidable valve having ports for providing communication between said supply line and said burner, a rotary valve for regulating and controlling the registry of said ports with said supply line and an independent adjustable needle valve extending through both said valves for regulating the flow of fuel to said burner.

2. In combination, a gas burner, a fuel supply line, and a fuel control assembly therebetween comprising a slidable valve having ports for providing communication between said supply line and said burner, a rotary valve for regulating and controlling the registry of said ports, with said supply line, said rotary valve encircling said slidable valve, and an independent adjustable needle valve extending through both said valves for regulating the flow of fuel to said burner.

3. In combination, a gas burner, a fuel supply line and a fuel control assembly therebetween comprising a slidable valve having ports for providing communication between said supply line and said burner, a rotary valve cooperating with the ports of said slidable valve and said supply line for regulating and controlling the registry of said ports with said supply line independently of said slidable valve, and an independent needle valve for regulating the flow of fuel through said assembly, said needle valve extending through and being adjustable in said slidable and rotary valves.

4. In combination, a gas burner, a fuel supply line and a fuel control assembly comprising a slidable valve having ports for providing communication between said supply line and burner, a rotary valve surrounding said slidable valve for controlling the registry of said ports with said supply line, and cooperating means on said valves for causing sliding movement of the slidable valve upon rotation of the rotary valve in one direction.

5. In combination, a gas burner, a fuel supply line and a fuel control assembly comprising a slidable valve having ports for providing communication between said supply line and burner, a rotary valve surrounding said slidable valve for controlling the registry of said ports with said supply line, cooperating means on said valves for causing sliding movement of the slidable valve upon rotation of the rotary valve in one direction, and means normally urging said slidable valve in one direction.

LESLIE F. STEVENSON.